US012328558B2

(12) United States Patent
Sørensen et al.

(10) Patent No.: US 12,328,558 B2
(45) Date of Patent: Jun. 10, 2025

(54) SOUND OUTPUT UNIT AND A METHOD OF OPERATING IT

(71) Applicant: Sowa Sound ApS, København V (DK)

(72) Inventors: Villads Sørensen, København NV (DK); Andreas Ranch, København N (DK); Mads Vraa, København S (DK); Søren Manicus, Charlottenlund (DK); Rune Domsten, Brønjshøj (DK)

(73) Assignee: Sowa Sound ApS, København V (DK)

( * ) Notice: Subject to any disclaimer, the term of this patent is extended or adjusted under 35 U.S.C. 154(b) by 248 days.

(21) Appl. No.: 18/002,173

(22) PCT Filed: Jun. 16, 2021

(86) PCT No.: PCT/EP2021/066242
§ 371 (c)(1),
(2) Date: Dec. 16, 2022

(87) PCT Pub. No.: WO2021/255095
PCT Pub. Date: Dec. 23, 2021

(65) Prior Publication Data
US 2023/0232153 A1 Jul. 20, 2023

(30) Foreign Application Priority Data
Jun. 16, 2020 (DK) ........................... PA 2020 70393

(51) Int. Cl.
*H04R 3/12* (2006.01)
*H04R 1/32* (2006.01)
(Continued)

(52) U.S. Cl.
CPC ............... *H04R 3/12* (2013.01); *H04R 1/323* (2013.01); *H04R 5/02* (2013.01); *H04R 27/00* (2013.01);
(Continued)

(58) Field of Classification Search
CPC . H04R 3/12; H04R 1/323; H04R 5/02; H04R 27/00; H04R 29/002;
(Continued)

(56) References Cited

U.S. PATENT DOCUMENTS

RE38,405 E 1/2004 Clair, Jr. et al.
2004/0240676 A1 12/2004 Hashimoto et al.
(Continued)

FOREIGN PATENT DOCUMENTS

CN 103167383 A 6/2013
WO WO 2006/131893 A1 12/2006
(Continued)

OTHER PUBLICATIONS

Choi, et al., Automatic Speaker Delay Adjustment System Using Wireless Audio Capability of Zigbee Networks, *AES 133rd* Convention, San Francisco, CA, USA, 2012, pp. 1-6.
1st Technical Examination Report from the Danish Patent Office of DK application No. PA 2020 70393 dated Dec. 16, 2020.

*Primary Examiner* — Sean H Nguyen
(74) *Attorney, Agent, or Firm* — Womble Bond Dickinson (US) LLP

(57) ABSTRACT

A system and a method for outputting sound where one or more first sound outputting units are identified and other, second, sound outputting units define a sound delay in accordance with the relative positions between each sound outputting unit and the first sound outputting unit(s). Microphones may be added to e.g. determine the amount and positions of persons.
The system may also use Intelligent cameras to determine number of people their position the room face direction and age distribution in order optimize audio level and equalisation of the frequency response—like in a church with many elder people or in a young audience at a live concert.

15 Claims, 1 Drawing Sheet

Figure 1:
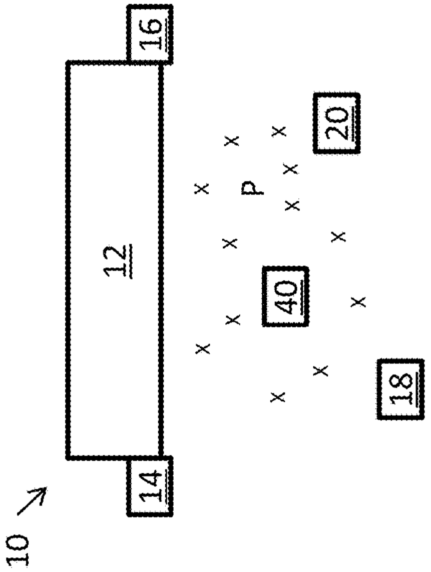

(51) Int. Cl.

| | |
|---|---|
| ***H04R 5/02*** | (2006.01) |
| ***H04R 27/00*** | (2006.01) |
| ***H04R 29/00*** | (2006.01) |
| ***H04S 1/00*** | (2006.01) |
| ***H04S 7/00*** | (2006.01) |

(52) U.S. Cl.
CPC ..... *H04R 29/002* (2013.01); *H04R 2201/025* (2013.01); *H04R 2227/007* (2013.01); *H04S 1/007* (2013.01); *H04S 7/301* (2013.01); *H04S 2400/15* (2013.01)

(58) Field of Classification Search
CPC ........ H04R 2201/025; H04R 2227/007; H04S 1/007; H04S 7/301; H04S 2400/15
USPC .......................................................... 381/303
See application file for complete search history.

(56) References Cited

U.S. PATENT DOCUMENTS

| | | | | |
|---|---|---|---|---|
| 2015/0189455 | A1* | 7/2015 | Donaldson ............ | H04R 27/00 381/77 |
| 2017/0048618 | A1 | 2/2017 | Shinotsuka et al. | |
| 2018/0077511 | A1 | 3/2018 | Mehta et al. | |
| 2018/0165055 | A1 | 6/2018 | Yu et al. | |
| 2018/0167760 | A1* | 6/2018 | Yu ...................... | H04N 21/4305 |
| 2022/0201418 | A1* | 6/2022 | Salehin ................ | G10L 19/167 |

FOREIGN PATENT DOCUMENTS

| | | | |
|---|---|---|---|
| WO | WO 2007/068257 | A1 | 6/2007 |
| WO | WO 2014/121828 | A1 | 8/2014 |
| WO | WO 2019/142407 | A1 | 7/2019 |

* cited by examiner

SOUND OUTPUT UNIT AND A METHOD OF OPERATING IT

CROSS-REFERENCE TO RELATED APPLICATIONS

This application is a national stage filing under 35 U.S.C. 371 of PCT/EP2021/066242, filed Jun. 16, 2021, which was published by the International Bureau in English on Dec. 23, 2021, and which claims priority from Denmark Application No. PA 2020 70393, filed Jun. 16, 2020, each of which is hereby incorporated in its entirety by reference in this application.

The present invention relates to sound output units comprising positioning determining capabilities such as for use in delivering sound to small and large crowds or audiences, which sound output units are easier set-up as they may determine individual distances and/or positions and determine delay therefrom.

In a first aspect, the invention relates to a method of operating a plurality of sound output units positioned in a room, space or venue, each sound output unit comprising:

a position determining element, an audio signal input, a sound generator, and a signal delay circuit configured to set a delay between the audio signal input and the sound generator, the method comprising:

identifying one or more first sound output unit(s) of the plurality of sound output units, determining, for each of one or more second sound output units, not comprising a first sound output unit, and by the positioning determining elements of the first sound output unit(s) and the second output unit:

a relative distance from the pertaining second sound output unit to the first unit(s) and, based on the distance, a delay setting of the signal delay circuit of the pertaining second sound output unit.

In the present context, a plurality of sound output units is two or more sound output units, such as 3, 4, 5, 6, 7, 8, 9, 10, 15, 20, 25 or more sound output units.

The room, space or venue may be smaller rooms, naturally, but will usually be stadiums, arenas, indoor or outdoor, conference venues, outdoor festival scenes, gardens or the like.

Often, an area of 100 $m^2$ or more, such as 500 $m^2$ or more, such as 1000 $m^2$ or more, such as 10,000 $m^2$ or more is seen.

A sound output unit comprises a sound generator for outputting sound. Sound generators usually convert an electrical signal into sound and are often called drivers or loudspeakers.

The audio signal input is for receiving an audio signal to ultimately be fed to the sound generator. The audio signal may be an electrical signal received from an amplifier which is external to the unit. Alternatively, the audio signal may be an electrical signal received from a remote console, such as a mixer, filter or the like, and which is to be amplified by an amplifier internal to the unit. Further alternatively, the audio signal input may comprise a receiver for a wireless signal, such as a radio wave signal, optical signal or other wireless signal. This receiver may then feed a signal to e.g. an amplifier generating a signal for the sound generator.

Naturally, a number of other elements may be present and used in relation to the audio signal or the signal for the sound generator. An amplifier may, as mentioned, be provided for amplifying a weak audio signal into a signal useful for the sound generator. Also, filters, equalizers or the like may be provided for adapting contents of the audio signal or any amplified signal before feeding to the sound generator. Multiple sound generators may be provided, and circuits may be provided for splitting the audio signal or amplified signal into individual signals for individual sound generators.

A signal delay circuit is provided which is configured to set a delay between the audio signal input and the sound generator. Naturally, a delay may be present between receiving an audio signal input and until the corresponding sound is output from the sound generator, but the signal delay circuit is capable of increasing that delay if desired. Clearly, as the speed of sound is much lower than the speed of the audio signal fed to the individual sound output unit, it may be desired to delay the sound signal. The sound output from the sound output unit preferably is output simultaneously, preferably in phase, as a similar audio signal that has travelled through the air at the speed of sound from another sound output unit.

Naturally, the speed of sound may be assumed, measured directly or estimated based on measured or received parameters, such as ambient pressure (barometric), humidity, and/or temperature and the like. This assumption, reception or determination may be made in the position determining element.

A position determining element is also provided. This element may be configured to determine its position vis-à-vis other sound position determining elements and/or sound output units. The position may be in the form of a distance to one or more sound output units and/or directions toward these. A position may alternatively be a position in a predetermined coordinate system, such as the longitude/latitude system of the earth. Positions may also be relative to other objects or other sound output units. The positioning determining element may comprise means for determining its position in a predetermined coordinate system, such as using GPS signals or other signals output from predetermined emitters. Triangulation and the like may be used for this purpose.

In other embodiments, the positioning determining element may be configured to receive signals from other position determining elements to determine distances, directions or the like between them. A position may be determined in 2D, such as in a horizontal plane, or in 3D. This may be based on radio waves, such as time-of-flight measurements determining distances from the time of flight.

The method comprises identifying one or more first sound output unit(s). A single sound output unit may be identified, or more sound output units may be identified. If multiple first sound output units are identified, the distance may be determined to/from a position derived from positions of the first units.

Clearly, the present set-up may be used as an add-on or extension of an existing sound system, so as to e.g. extend the PA area farther from e.g. a stage. Then, the first sound output unit(s) may themselves output sound which is delayed relative to the “main” sound system.

A first sound output unit may be identified by selecting it. A selection or identification may be made by entering information into one or more of the sound output units or into a system configured to control the sound output units, such as to instruct the second sound output units to determine the relative distance and the delay setting. Another manner of identifying or selecting a sound output unit as a first sound output unit would be to feed a signal, such as a sound signal, into this unit. This sound signal may then be forwarded to the other sound output units, and the sound output unit originally receiving this signal, such as via a sound input port or channel, may then be set to be the first output unit. Naturally, a sound signal may be fed to multiple sound output units so that multiple first sound output units are provided, such as when a left and a right channel of the signal is fed to different sound output units. In this context, the audio signal input of the sound output unit may comprise two types of inputs, where one input is configured to receive a sound signal from another sound output unit, such as a first sound output unit, and another to receive a sound signal from an external source, such as a mixer, a music player, directly from a microphone, or the like. Then, the first sound output unit would be that receiving a signal on the "other" input, which could then be adapted to forward the sound signal to the "one" input of the other, second, sound output units.

The sound output units which are not selected or automatically identified may be the second sound output units. Naturally, sound output units may be neither a first nor a second sound output unit and may not take part in this method but may e.g. receive delay settings from e.g. a predetermined second sound output unit.

The delay determined in a second sound output unit is a delay vis-à-vis the first output unit(s). The delay may be determined from only the relative distance between that second unit and the first unit(s). Thus, the delay may be independent of the positions of the other second units. If the first output unit itself has a first delay, this first delay may be added to the delay calculation in the second unit to arrive at a resulting delay to use in that second unit. The delay determined preferably is to the effect that sound from the first sound output unit reaches the second sound output unit when the second sound output unit outputs that sound.

The relative distance may be determined as described above in any desired manner, such as by a wireless technology. The relative distance may be determined from e.g. positions of the sound output units.

In a preferred embodiment, a wireless method is used based on a roundtrip measurement where a second unit outputs a signal to a first unit which immediately retransmits it back to the second unit. The delay thus indicates the distance between the two units. Such methods are possible using e.g. LoRa or FLRC technology, which is desired also for other reasons.

The delay may be set based on a calibration defining a relationship between distance and desired delay. Alternatively, the delay may be determined based on a technology where the position determining element of a second sound output unit comprises a microphone for detecting a sound conveyed acoustically from the first sound output unit. The acoustically registered signal may then be compared to a timewise portion of the audio signal received on the audio signal input. Preferably, the two units receive the same audio signal. The desired delay may be determined from the point in time of receiving a particular portion of a sound signal from the audio signal input and until detecting, using the microphone, a sound corresponding to the particular portion of the sound signal output as sound form the first output units.

A maximum delay of the data for a sound output unit may be determined. A maximum delay may be the delay accepted so that no additional delay is set in the sound output unit. When the maximum delay is known, data routing paths may be set up, including any repeaters, which satisfies such delay requirements. Naturally, data for one sound output unit may reach this unit via other sound output units and/or repeaters.

In one embodiment, the method further comprises the step of determining a direction of the second sound output unit(s). Based on the direction, it may be possible to determine a distribution, such as a map, of sound or sound pressure/intensity in an area at or around the second and potentially also the first sound output units. In this situation, it may be desired to know the sound output intensity from the second sound outputting unit(s). This may be determined using a microphone (see also below) or from knowledge of an intensity of the signal received on the audio signal input, or values of a signal streamed to the sound outputting unit, for example.

In this manner, it may be decided whether one or more second sound output units is to be rotated to arrive at a desired, such as a more even, distribution of the sound. Rotation may be physical. Alternatively, the sound generator may comprise a phased array so that the rotation may be handled purely electrically.

In addition, it may be determined that one or more second sound outputting units is/are desired in order to arrive at a desired distribution, such as a desired minimum sound pressure. From this determination, it may also be determined where to position such second sound outputting unit(s) as well as, potentially, the direction thereof.

This optimisation of coverage may also be used across the audio frequency spectrum to fill in, or attenuate, certain audio frequencies that may either be locally missing, or louder than intended in the audio signal input, due to either positive or negative audio interferences caused by the acoustics of the environment in which the system is operating, and the audio sources present in the environment.

In that or another embodiment, the method further comprises the step of receiving, by one or more microphones, sound from surroundings of at least one of the second sound output units.

In this situation, the surroundings may be defined by any distance from which sound may be detected by the microphone. It may be desired to subtract, from a signal from the microphone, a signal representing the sound output by the sound generator so that the signal from the microphone represents sound generated not by the sound generator but by persons or other sound generators.

The output of this microphone may be used in a number of manners. In one situation, the microphone may be directed to, or positioned so as to face another sound outputting unit. In that situation, the output of the microphone may be used for estimating a sound output intensity of that other sound output unit.

The microphone may additionally or alternatively be used for determining positions of walls, ceilings, floors and/or other elements in the surroundings of the sound outputting unit. Such elements, which are normally rather hard and/or dense, often reflect sound from the sound output unit, and this reflection may be determined. Then, a distance toward a wall or the like may be determined. If multiple microphones are used, such as a directional microphone, also the direction toward this element may be determined. This reflection may then be determined and taken into account in e.g. a filtering of a signal for the sound outputting unit to reduce or minimize the effect thereof.

The microphone output may additionally be used for detecting or determining persons and/or noise in the surroundings of the sound outputting unit or around it. It may be assumed that all noise not stemming from the pertaining sound outputting unit or any first and second sound outputting unit may stem from persons. From the sound intensity, the number of persons may be estimated. Sound analysis may be used for distinguishing voices to arrive at a better estimate of the number of persons. Directional microphones or multiple microphones of different sound outputting units may be used, if a position of one or more persons is to be determined with a good precision.

Other sensor types exist for determining or detecting persons. In another embodiment, a camera, such as with built-in processor, may be used for determining a position of persons and/or a direction of such persons, such as of their heads (in which direction are they pointed). In addition, an age distribution of the persons may be determined.

This information may be used for determining the position, concentration or the like of persons. A concentration and/or the positions of persons may be compared to a sound intensity map to determine whether the sound intensity is desired where the persons are positioned. Clearly, such information may be combined when derived from multiple sound outputting units. Also, the sound intensity and perhaps frequency distribution output may be determined based on the above data.

If the sound output intensity is not as desired compared to the person's positions or concentration, the output intensity and/or direction of the second sound outputting unit or a number of the sound outputting units may be controlled to arrive at a desired sound distribution.

The position and/or concentration of persons may also be used for controlling a maximum or minimum sound output pressure of the second sound outputting unit or the sound outputting units in general, as it may be desired that a person is exposed to a sound pressure not exceeding a selected sound pressure/intensity. Thus, if one or more persons are too close to the sound outputting unit, the sound pressure output may be reduced. Also, if persons are not close to the sound outputting unit, the sound pressure output may be increased to provide a higher sound pressure at larger distances from the sound outputting unit.

In that or another situation, the method may comprise using the microphone for detecting voice or speech and for transmitting a corresponding signal to other of the sound outputting units. This may be a situation where the sound outputting units are used at e.g. a conference where a person poses a question or comments on e.g. a topic, where this audio is then fed to the other sound outputting units so that other participants may hear it. In that situation, the person may speak to the nearest sound outputting unit and thus not need a handheld microphone. Clearly, microphones of multiple sound outputting units may be used, together with suitable controlling, to "home in on" the person in the same manner as a directional microphone. In that situation, noise from other persons may be reduced or eliminated. A controller or an operator may identify the person or the person's position relative to the sound outputting units in order for the electronics to be primarily sensitive to audio from that area or person.

One or more microphones may alternatively or additionally be used for surveillance or monitoring of the surroundings, such as in order to detect problems or crises in the surroundings. Agitated speech or shouting may be detected as may a position thereof, so that law enforcement or medical personnel may be directed to the position without having to wait until a bystander calls for assistance.

Clearly, a sound outputting unit may have a number of microphones, such as positioned at different positions thereof, such as on different sides thereof.

Naturally, persons may be determined or detected using also other means, such as PIR sensors and/or proximity sensors. Different technologies exist for such sensors, such as optical sensors. Persons emit, for example, heat which may be detected.

In one embodiment, the method further comprises the step of rotating one or more second sound output unit(s). This rotation may be automatic or remote controlled and performed using e.g. an actuator provided in the sound output unit or in a support or rig to which the sound output unit is attached. The rotation may be controlled by the positioning determining element of a sound output unit, a remote controller, or a remotely operated controlling unit, for example. A rotation may be performed to re-direct the sound output of the sound output unit. This may be a physical rotation or a rotation caused by altering the control of a phased array of sound emitters. As described above, the rotation may be performed in correspondence with where persons are positioned at or around the sound output unit. As will be described below, also the emission characteristics of the sound may be altered.

In a preferred embodiment, the position determining element may be detachable from the sound generator. The sound generator may form part of a more or less standard loudspeaker comprising the audio signal input and the sound generator. This loudspeaker may also comprise an amplifier, filters and the like and even the signal delay circuit. Alternatively, the audio signal input and the signal delay circuit are attached to the position determining element. Thus, a legacy loudspeaker may be made intelligent by attaching the position determining element, optionally also comprising the signal delay circuit and the audio signal input, so that the loudspeaker becomes able to form part of the system described above. The position determining element thus may be configured to not only determine the position but also receive the audio signal and determine and perform the delay. The resulting signal may then be fed to the loudspeaker as a signal of the usual type (amplified or not), so that the sound output of the loudspeaker is as described above. For this unit to be self-contained, the position determining element may comprise an internal power source, such as a battery, solar panel or the like.

Another aspect of the invention relates to a system comprising a controller and a plurality of sound output units, each sound output unit comprising:

- a position determining element,
- an audio signal input,
- a sound generator, and
- a signal delay circuit configured to set a delay between the audio signal input and the sound generator, the controller being configured to identify one or more first sound output unit(s) of the plurality of sound output units, each of one or more second sound output units of the plurality of sound output units, not comprising a first sound output unit, being configured to:

- determine, based on an output from the positioning determining elements of the first sound output unit(s) and the second output unit, a relative distance from the pertaining second sound output unit to the first unit(s) and
- determine, based on the distance, a delay setting of the signal delay circuit.

Naturally, all elements, features, embodiments, situations and the like of the first aspect of the invention are equally relevant in relation to this aspect of the invention.

Thus, the position determining element may be configured to perform the determinations described above. This element may comprise one or more antennas or sensors for determining the position. A position may be determined based on signals received from other elements, such as other position determining elements, GPS satellites, GSM/WiFi/Bluetooth antennas or the like. Position determination using such signal types is known, such as based on triangulation.

Relative positions may also be determined based on optical information, such as using cameras, range finders or the like.

The positioning determining element may comprise a processor or controller configured to determine the position, or the information from sensors/antennas or the like may be output to a central controller determining the position for this or all sound output units. Communication with this central controller may be via an antenna or a cable.

The audio signal input is the input which receives an audio signal ultimately desired output as sound from the sound generator. Naturally, the sound output unit may comprise one or more amplifiers, filters or the like for adapting a signal received on the audio signal input before feeding to the signal generator.

The audio signal input may be configured to receive an analogue signal, a digital signal or the like. The signal may be via wires or received from a wireless source. If the signal is digital, it may be desired to provide a Digital-to-Analogue converter or a digital amplifier (Class D amplifier) to convert the signal before feeding to the sound generator. As mentioned above, the input may comprise multiple inputs or input types. One input may be for when the unit operates as a second unit and when another input is used, the unit may be operated to, such as instructed to be operated as, a first unit. Alternatively, a single input may be provided, where other means or manners are provided for identifying the unit as a first unit.

The sound generator may comprise one or more so-called drivers, such as mid-range drivers, tweeters, bass drivers or the like. The sound generator and driver(s) may operate using any technology, such as moving magnet, piezo-drivers, magnetostatic or electrostatic designs or the like. A sound generator usually is configured to convert an electrical signal into a sound signal preferably with the same frequency components at least within a predetermined frequency interval, such as 20 Hz-20 kHz or 50 Hz-10 kHz.

The signal delay circuit may be embodied in a number of manners. Filters and other circuits cause a delay of a signal. The delay circuit may operate on analogue or digital signals of any voltage. The circuit may operate on a signal already amplified for the sound generator or a low voltage signal which is to be amplified. The circuit is configured to provide a desired, usually variable delay to a signal.

The controller is configured to identify one or more first sound output unit(s) of the plurality of sound output units. The controller may form part of one or more position determining elements or may be a central, potentially remote unit. The controller may be software based and provided on e.g. an iOS or web app. The controller may be as simple as a switch or push button (or other user operable element) of the position determining element which may be operated to inform the position determining element that this position determining element or sound output unit is a first or a second unit.

Alternatively, the controller may be a central controller configured to communicate a selection of the first units to the second units. A second unit may derive that it is a second unit when not receiving information that it is identified. Alternatively, second units may receive information that they are second units.

The controller may, in one embodiment, receive position information from the sound output units and/or determine its position relative to the sound output units, and illustrate on a display the sound output units, preferably in a manner so that the positions or relative positions thereof is clear, so that a user may determine, on or from the display, which units are first units. Thus, the position determination may be performed prior to and independently of the determination of the delay(s).

Each second unit is configured to:

determine, based on an output from the positioning determining elements of the first sound output unit(s) and the second output unit, a relative distance from the pertaining second sound output unit to the first unit(s) and determine, based on the distance, a delay setting of the signal delay circuit.

The relative distance thus is determined from an output of the first unit(s) and the pertaining second unit. As will be described below, multiple technologies exist for determining relative distances and/or positions.

The distance may be determined in the form of a relative position, so that not only the distance is known but also a direction between the second unit and the first unit(s). The direction or relative position may be in 2 dimensions, such as when projected on to a horizontal plane, or in 3 dimensions.

The manner in which the second unit determines the distance may vary. Naturally, wired technologies are known, but preferably, a wireless technology is employed, such as time-of-flight or a range finder, vision technology, 2D/3D vision, RF technology, RADAR/LIDAR or the like.

From the distance, a delay may be determined. This delay may have to do with the time during which sound travels the distance determined. In this context, also the direction between the second unit and first unit(s). A preferred or main direction of sound emission may be determined and the delay may relate to the distance or direction projected on to this preferred/main direction.

The delay may be determined and set automatically once the distance is determined.

The distance and delay may be determined upon receipt of an instruction from e.g. an operator, when the position determining element is powered on, when instructed to do so from a central console, or regularly and/or intermittently, so that position and/or direction changes are automatically taken into account. More complex scenarios may also be seen, such as when the unit or position determining element comprises a movement sensor, such as an accelerometer, indicating movement, so that a new distance determination may be made when movement has been detected.

Such an automatic in-operation change in delay setting of the second sound output units may in some embodiments be sonically masked or avoided by the signal delay circuit, in such a way that audio artefacts from the delay change do not noticeably affect the audio experience for the listener. This may for example be achieved by waiting for the audio signal input to drop below a certain threshold, or by inserting synthesized or interpolated audio samples into the audio stream between the audio signal input and the sound generator.

In one embodiment, at least one of the second sound output units comprises a direction sensor. A direction sensor may be based on e.g. a compass or a direction toward a predetermined position, such as a beacon. The direction of the unit may be a direction in which sound is output from the unit. This direction may be taken into account when determining the delay. If the direction is toward the first unit(s), sound is emitted toward positions closer to the first unit(s).

Then, the delay may be reduced compared to the situation where the direction is away from the first unit(s) and where sound is directed toward positions farther away from the first unit(s).

An additional or alternative use of a direction may be where an element, such as the controller, determines from the direction(s) of the units a map over sound distribution within an area in which the units are provided. This map may illustrate the sound intensity/pressure within this area, such as at a number of positions within the area. From this map, it may be determined whether the sound pressure at a position is above or below a threshold. If the sound pressure is above a threshold limit, one or more units directing sound to that position may be identified and controlled to emit a lower sound pressure or to turn off.

If a position is identified at which the sound intensity/pressure is below a threshold limit, one or more units may be identified emitting sound toward that position may be identified and controlled to emit a higher sound pressure. Alternatively, it may be decided to add a unit and direct it toward that position.

From the map, units may be rotated, moved, added, removed so that a desired or optimal sound pressure distribution is obtained.

Naturally, the map may be illustrated in any manner. On a display, the sound pressure may be indicated with colours. The thresholds or other limits may also be indicated. The map may be manipulated by simulating e.g. rotation or repositioning of units as well as the altering of a sound pressure output thereof as well as addition or removal of units, so that a desired, acceptable or optimal sound pressure distribution may be obtained. Then, instructions may be output to units as to a sound pressure to output (such as for controlling an amplifier therein) and/or a rotation to perform. Some units may also be able to reposition themselves, such as move using wheels or the like, so that also repositioning may be controlled remotely.

Rotation or re-direction of sound output from a unit may be a physical rotation of the sound generator or a sound guiding element, such as a horn. To obtain such physical rotation, the unit may comprise an actuator, such as a motor, configured to rotate the sound generator relative to e.g. a support/rig or an engagement element of the unit capable of engaging such a support or rig. Then, when the unit is attached to the support/rig, the motor may rotate the unit or at least the sound generator relative to the support or rig.

Alternatively, the sound generator may comprise a phased array, so that the re-directing may be obtained purely electrically.

In one embodiment, at least one of the second sound output units comprises one or more microphones.

Different manners of using the output from one or more microphones are described above. The microphone(s) may be attached to a housing of the unit, such as to the position determining element so as to be integral therewith. Multiple microphones may be used if desired.

In general, the position determining element may comprise the audio signal input and be able to receive the audio signal as a wireless signal. The position determining element then may be configured to output an audio signal to the sound generator. An amplifier may be provided in the positioning determining element or elsewhere to amplify the audio signal received before feeding to the sound generator. Filters or the like may also be provided.

In one embodiment, the position determining element is detachable from the sound generator. Thus, the sound generator may form part of a legacy loudspeaker having the sound generator. The loudspeaker may also comprise amplifier/filters or the like and will have an input configured to receive a signal eventually to be output from the loudspeaker as sound. The input may be configured to receive a signal of sufficient amplitude for it to be forwarded to the sound generator or a signal of low amplitude which is to be amplified before feeding to the sound generator. The signal may be digital or analogue.

The position determining element then may be configured to output a signal of the type expected by the loudspeaker. The position determining element thus is capable of determining the distance as well as generating the delay and feed a resulting signal to the loudspeaker. Then, any legacy loudspeaker may be made capable of being a part of the present system by attaching it to a position determining element of this type.

The position determining element or the unit may receive the audio signal via a wireless connection. This wireless connection may additionally be used for transmission of data, such as position data, direction data, amplifier setting data, filter setting data, microphone output data, person/noise detection data, and the like.

A third aspect of the invention relates to a sound output unit for use in the system according to the second aspect of the invention.

A fourth aspect of the invention relates to a position determining element for use in the system according to the invention. This element may be attachable to a loudspeaker and may be configured to determine a distance to the first unit(s), receive an audio signal, determine and add a delay to the audio signal and output a delayed audio signal which may be fed to a loudspeaker.

Figure 2:
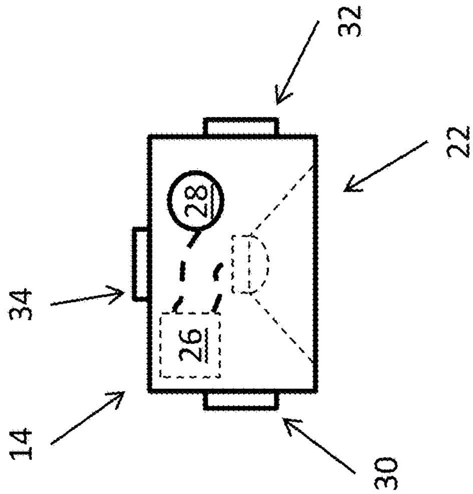
Figure 3:
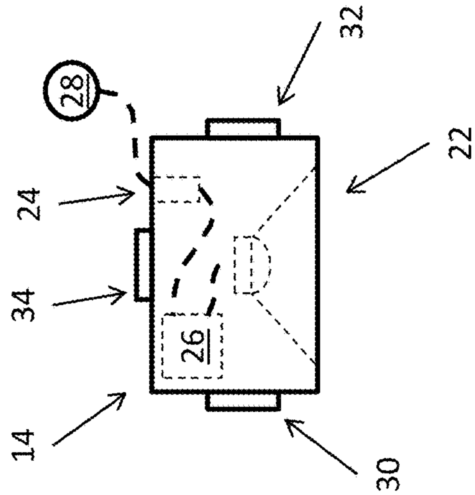
Figure 4:
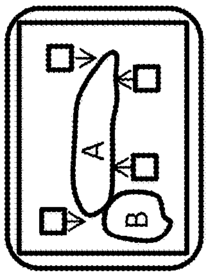

In the following, preferred embodiments will be described with reference to the drawing, wherein:

FIG. 1 illustrating a system according to the invention for delivering sound from a stage, FIG. 2 illustrates a first embodiment of a sound output unit according to the invention, FIG. 3 illustrates a second embodiment of a sound output unit according to the invention, and FIG. 4 illustrates a map of sound pressure.

In FIG. 1, a stage 12 is illustrated as is a number of sound output units 14, 16, 18 and 20 for outputting sound from signals received from the stage.

Sometimes, the units 14 and 16 suffice to deliver a suitable sound pressure in the venue. Sometimes additional units 18 and 20 may be required positioned further into the crowd to be entertained. Sometimes additional units are required.

However, when multiple units can be heard by the same person in the audience, it is desired that the two units are synchronized to not hear an echo or experience phase problems. In practice, this means that the sound from the closest unit is delayed compared to that from the unit farther away, so that the sound from both units reaches the person at the same time.

Sound delay is set electronically in a unit by varying parameters of a circuit thereof between the audio input and the sound generator.

In FIG. 2, a sound output unit 14 is illustrated which has a sound generator 22 and electronics 26 configured to receive the audio signal and feed an electrical signal to the sound generator 22. The electronics 26 may comprise an amplifier, an equalizer and/or other filters for imposing adapting a signal before feeding a corresponding signal to the sound generator.

In addition, the unit 14 comprises a position determining element 28 which in FIG. 2 is an integral part of the unit 14. The element 28 comprises communication capabilities, such as an antenna, configured to communicate with other positioning determining elements. The positioning determining element 28 may additionally be configured to output a signal to the electronics 26 for controlling a delay caused by the electronics 26. In this situation, the audio signal for the unit may be received as described in relation to FIG. 3.

The position determining element may additionally be configured to, itself, receive the audio signal to be output from the sound generator. Then, the position determining element may itself generate or impose the determined delay, so that the signal output of the position determining element is already delayed. The position determining element may also comprise any amplifiers, filters or the like, so that the signal output of the position determining element may be fed directly to the sound generator.

The position determining element 28 may alternatively (see FIG. 3) be detachably attached and may have an audio signal output configured to be connected to an audio signal input 24 of e.g. a standard loudspeaker. Then, an audio signal may be fed, such as streamed, to the element 28 which may then feed the signal to the input 24. In this situation, the electronics 26 may be provided in the loudspeaker, or the operation of the electronics 26 may be handled also in the element 28, so that the unit 14 without the element 28 may be a legacy loudspeaker.

Naturally, the element 28 but also all of the unit 14 may be battery operated. Alternatively, power may be derived from e.g. a cable connected to the input 24 if provided and desired.

The operation of the system and sound output unit is that one or more sound output units is/are identified. Distances or even relative positions between the individual sound output units are determined using the positioning determining elements 28 and the delays are set in the individual sound output units so that the sound emitted from a non-identified sound output unit is synchronized with the sound output from the identified sound output unit(s).

If multiple sound output units are identified, a reference position may be determined at a position between these units and the delays set based on the distance or relative position from that position to a sound output unit. In one situation, two units positioned on either side of a stage are identified where after the delays are set in accordance with a position on the stage.

The positioning determining elements 28 may operate on radio waves and time-of-flight measurements between positioning determining elements 28. Time of flight may be determined using e.g. 2.4 GHz transmission with FLRC or LoRa modulation, which may also be used for transmitting the actual audio signal as well as carrying additional data, such as settings, distances, positions, sensor output and the like.

Based on such determination, all positioning determining elements may know their relative position to other positioning elements and thus determine the delay.

Often, one or more positioning determining elements or units 14 may be determined at or close to the desired source of the sound or the starting point of desired sound propagation. In one situation, the source of the sound is a stage on which one or more artists perform or one or more speakers speak. In other situations, a position in or around a center P of an area or a crowd may be identified (see FIG. 1). In a further situation, another element may be identified, such as a microphone used by an artist, such as on the stage. Thus, as the artist moves around, including in the audience, the delay will follow this position.

A sound generating unit or a positioning determining element may be identified by operation of e.g. a push button or the like on the unit or element. A bi-stable element thus may have a "master" setting and a "slave" setting, for example.

Alternatively, a separate controller 40, which may be handheld, may be used for identifying one or more unit(s) or element(s). The units and elements may communicate to determine relative distances and/or positions, which may be represented on a map or other illustration in which the controller may identify one or more units or elements. This identification information may then be output to the units or elements and the delays set accordingly.

An example of a map is seen in FIG. 4 in which the sound output units are indicated as squares with arrows indicating the direction of emission of sound and where an area A is illustrated in which the sound pressure is above a predetermined threshold. An area B is also indicated in which the sound pressure is lower than the same or another threshold limit. Thus, it may be desired to add a unit directing sound to the area B or to move and/or rotate the unit to the lower left so that it emits sound toward the area B.

This knowledge may be used for other purposes also, as will become clear below.

A number of additional functionalities may be incorporated in the unit 14 or the element 28, such as a directional sensor, such as a sensor capable of estimating a sound output direction of the sound generator 22, or a predetermined direction of the housing of the unit 14, relative to either other units or in relation to a predetermined coordinate system, such as the earth. The directional sensor may thus be a compass or a directional antenna capable of not only receiving a signal from another unit but also to determine a direction of such received signal.

On the basis of an output of a directional sensor, the unit 14 may estimate its angle or direction relative to a desired direction, such a direction toward or away from a position, such as an identified unit or a position between a number of identified units. The unit 14 may determine whether it needs to rotate. Rotation may be a physical rotation of the unit, such as relative to a stand or rig supporting it. Clearly, this rotation may be remote controlled and caused by one or more actuators of the unit or stand/rig. Alternatively or additionally, rotation may be a rotation of sound output direction using a phased array of sound generators.

A direction may be fed to a processor 40 which may determine a sound pressure or sound intensity map of the scene or venue by overlapping the sound output directions and potentially sound intensity function of each unit 14. Then, it may be determined that the sound intensity at a position is not sufficiently high but that this may be corrected by rotating one or more units to a direction toward or closer to the position. Alternatively, the analysis may reveal that one or more additional units is/are required. Also, the position and direction of this/these may be determined.

In addition or alternatively, an emission angle of the sound output may be altered. This is rather simple using phased arrays but is also possible using mechanical horns and the like in standard sound generators. This angle may also be taken into account when making the above map and may be altered to arrive at the desired sound intensity map.

In a particularly interesting embodiment, the unit 14 comprises one or more microphones. A microphone may be used for sensing the sound output intensity of the sound generator of the unit 14 to e.g. ensure that the sound output intensity does not exceed a maximum value.

A microphone may also be used for determining a sound output intensity from another unit outputting sound toward the unit with the microphone. In this manner, the sound intensity coverage of the scene or venue may be estimated or corrected.

A microphone may additionally or alternatively be used for detecting or quantifying sound reflections from e.g. solid structures such as walls, buildings, ceilings or the like. This information may be used for determining a distance to such structures and/or for correcting the sound output of the unit, such as by settings in the electronics 26. Additionally or alternatively, the information may be fed to the controller 40 for use in an analysis or planning of the sound providing to the area.

Microphones may also be used for other purposes. In one situation, the output of the microphone may be used for detecting sounds other than that output from the unit(s) 14, such as noise, persons or the like. The microphone may then be used for generating a signal which may be used for estimating the number of persons in the vicinity of the unit 14. If multiple microphones are present, such as one or more directional microphones, also positions of such persons may be estimated. Then, it may be estimated whether it would be desirable to rotate the unit or the sound output thereof in order to direct the sound toward one or more persons not positioned directly in front of the sound generator 22.

The number of persons or the amount of noise may also be used for estimating whether the sound output intensity should be increased or lowered. If the amount of noise or number of persons is lower than expected, the sound intensity may be higher than desired, and if the persons make more noise than expected, it may not be possible for everybody to hear the output of the units 14 with the desired sound pressure, so the sound intensity output may be increased. If a person comes too close to the unit 14, the sound intensity may also be reduced to not cause damage to that person's hearing.

Also, it may be desired to use the units 14 as sound receivers. If used at a convention or speech, the units 14 may be used as microphones to pick up questions from the audience. If multiple units 14 have microphones, a microphone array is generated which may be used to focus the sound reception from a particular position in the audience and thereby reduce the noise generated from other participants. This may be obtained by combining the sound received from multiple units and add the required delays to arrive at the operation of a directional microphone.

Clearly, such microphones may also be used for surveillance or monitoring of large crowds. Distress calls or agitated yelling may be detected and the position thereof determined, so that assistance may swiftly be directed to the location.

Thus, one or more microphones may be provided in the unit. Naturally, the microphone(s) may be provided at the desired positions of the unit depending on the desired operation thereof. If it is desired to determine the sound pressure from another unit, the microphone may be provided oppositely to the sound generator, such as at position 34. For crowd surveillance, sound pickup from participants, wall detection or the like, the positions 30 and 32 on the sides of the unit 14 may be desired. Also, a microphone may be directed in the same general direction as the sound generator 22. Clearly, all such microphones may be provided in the element 28 for easy handling and incorporation.

The invention claimed is:

1. A method of operating a plurality of sound output units positioned in a room, space or venue, each sound output unit comprising:

a position determining element, an audio signal input, a sound generator, and a signal delay circuit configured to set a delay between the audio signal input and the sound generator, the method comprising:

identifying one or more first sound output unit(s) of the plurality of sound output units, determining, for each of one or more second sound output units, not comprising a first sound output unit, and by the positioning determining elements of the first sound output unit(s) and the second output unit:

a relative distance from the pertaining second sound output unit to the first unit(s) based on time-of-flight measurements of radio waves between position determining elements and, based on the distance, a delay setting of the signal delay circuit of the pertaining second sound output unit.

2. The method according to claim 1, further comprising the step of determining a direction of the second sound output unit(s).

3. The method according to claim 1, the method further comprising the step of receiving, by one or more microphones, sound from surroundings of at least one of the second sound output units.

4. The method according to claim 1, further comprising the step of estimating, based on the sound received, a number of persons in the surroundings of the second output unit(s).

5. The method according to claim 1, further comprising the step of rotating one or more second sound output unit(s).

6. The method according to claim 1, wherein the determination of the relative distance and the delay setting is performed intermittently.

7. The method according to claim 6, wherein the second sound output unit comprises a movement sensor triggering a determination of the relative distance.

8. A system comprising a controller and a plurality of sound output units, each sound output unit comprising:

a position determining element, an audio signal input, a sound generator, and a signal delay circuit configured to set a delay between the audio signal input and the sound generator, the controller being configured to identify one or more first sound output unit(s) of the plurality of sound output units, each of one or more second sound output units of the plurality of sound output units, not comprising a first sound output unit, being configured to:

determine, based on a radio wave-based time-of-flight measurement between position determining elements based on an output from the positioning determining elements of the first sound output unit(s) and the second output unit, a relative distance from the pertaining second sound output unit to the first unit(s) and determine, based on the distance, a delay setting of the signal delay circuit.

9. The system according to claim 8, wherein at least one of the second sound output units comprises a direction sensor.

10. The system according to claim 8, wherein at least one of the second sound output units comprises one or more microphones.

11. The system according to any of claim 8, wherein the position determining element is detachable from the sound generator.

12. A sound output unit for use in the system according to claim 8.

13. The system according to claim 8, wherein the one or more second sound output units is configured to intermittently determine of the relative distance and the delay setting.

14. The system according to claim 13, wherein each of the one or more second sound output units comprises a movement sensor configured to trigger a determination of the relative distance.

15. The system according to claim 8, wherein the controller is configured to determine a position between multiple identified first sound output units, and wherein each of the one or more second sound output units is configured to determine the distance or relative position between that of the position and the pertaining second sound output unit.

* * * * *